(12) United States Patent
Li et al.

(10) Patent No.: US 11,419,097 B2
(45) Date of Patent: Aug. 16, 2022

(54) METHODS AND NODES FOR COMMUNICATION ON MULTIPLE CHANNELS

(71) Applicant: Telefonaktiebolaget LM Ericsson (publ), Stockholm (SE)

(72) Inventors: Gen Li, Beijing (CN); Jinhua Liu, Beijing (CN); Rui Fan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 16/649,106

(22) PCT Filed: Sep. 18, 2018

(86) PCT No.: PCT/CN2018/106175
§ 371 (c)(1),
(2) Date: Mar. 19, 2020

(87) PCT Pub. No.: WO2019/057030
PCT Pub. Date: Mar. 28, 2019

(65) Prior Publication Data
US 2020/0229149 A1 Jul. 16, 2020

(30) Foreign Application Priority Data

Sep. 19, 2017 (WO) ................ PCT/CN2017/102315

(51) Int. Cl.
*H04W 72/04* (2009.01)
*H04W 74/08* (2009.01)
*H04W 16/14* (2009.01)

(52) U.S. Cl.
CPC ........... *H04W 72/04* (2013.01); *H04W 16/14* (2013.01); *H04W 72/0413* (2013.01); *H04W 74/0808* (2013.01)

(58) Field of Classification Search
CPC ............. H04W 16/14; H04W 72/0413; H04W 72/042; H04W 72/1284; H04W 72/1289;
(Continued)

(56) References Cited

U.S. PATENT DOCUMENTS

2008/0075029 A1* 3/2008 Song .................... H04L 45/123
370/311
2016/0157242 A1* 6/2016 Van Den Bosch ... H04W 72/08
370/329
(Continued)

FOREIGN PATENT DOCUMENTS

WO 2015/136504 A1 9/2015
WO 2017/030491 A1 2/2017
(Continued)

OTHER PUBLICATIONS

International Search Report and Written Opinion, PCT/CN2018/106175, dated Dec. 3, 2018, 9 pages.
(Continued)

*Primary Examiner* — Raj Jain
(74) *Attorney, Agent, or Firm* — Chrstopher & Weisberg, P.A.

(57) ABSTRACT

The present disclosure proposes a method of a first node which is capable of using multiple wireless channels, wherein one or more of the channels are occupied by the first node for its current transmission to a second node, the method comprising: sending an indication to the second node, to indicate the second node to transmit towards the first node on the one or more occupied channels in the period between the current transmission and the continuing transmission of the first node; and listening on each of one or more other channels in the multiple wireless channels in the period for the continuing transmission. With this method, the power leakage from the occupied channel(s) will not impact
(Continued)

the judgement of the listening of the first node on the other channel(s) in that period.

16 Claims, 4 Drawing Sheets

(58) Field of Classification Search
CPC ............. H04W 72/14; H04W 74/0808; H04W 74/085
See application file for complete search history.

(56) References Cited

U.S. PATENT DOCUMENTS

| | | | |
|---|---|---|---|
| 2017/0188342 A1 | 6/2017 | Liu et al. | |
| 2017/0230944 A1 | 8/2017 | Babaei et al. | |
| 2017/0257879 A1 | 9/2017 | Kang et al. | |
| 2017/0265214 A1 | 9/2017 | Hessler et al. | |
| 2018/0048498 A1* | 2/2018 | Stern-Berkowitz | H04L 5/0048 |
| 2018/0176956 A1* | 6/2018 | Koutsimanis | H04W 74/0808 |
| 2019/0053222 A1* | 2/2019 | Bhorkar | H04W 72/14 |
| 2020/0229149 A1* | 7/2020 | Li | H04W 72/04 |

FOREIGN PATENT DOCUMENTS

| | | |
|---|---|---|
| WO | 2017/076973 A1 | 5/2017 |
| WO | 2017/095277 A1 | 6/2017 |
| WO | 2017/099650 A1 | 6/2017 |
| WO | 2017/133778 A1 | 8/2017 |

OTHER PUBLICATIONS

Catt, "Required functionalities for Licensed-Assisted Access Using LTE", 3GPP TSG RAN WG1 Meeting #78bis, R1-143751, Oct. 6-10, 2014, 4 pages.

European Search Report and Search Opinion, EP App. No 18857746.4, dated Oct. 29, 2020, 12 pages.

International Preliminary Report on Patentability, PCT App. No. PCT/CN2018/106175, dated Apr. 2, 2020, 5 pages.

Examination Report, IN App. No. 202047013666, dated Apr. 28, 2021, 6 pages.

Intention to Grant, EP App. No. 18857746.4, dated Jul. 28, 2021, 5 pages.

* cited by examiner

METHODS AND NODES FOR COMMUNICATION ON MULTIPLE CHANNELS

CROSS-REFERENCE TO RELATED APPLICATIONS

This application is a National stage of International Application No. PCT/CN2018/106175, filed Sep. 18, 2018, which claims priority to International Application No. PCT/CN2017/102315, filed Sep. 19, 2017, which are hereby incorporated by reference.

TECHNICAL FIELD

The present disclosure relates to the field of wireless communication, particularly to methods and nodes for communication on multiple channels.

BACKGROUND

Mobile broadband will continue to drive demands for high overall traffic capacity and high achievable end-user data rates. Several use-cases and deployment scenarios will require data rates of up to 10 Gbps. These demands for very high system capacity and very high end-user data rates can be met by networks with distances between access nodes ranging from a few meters in indoor deployments to roughly 50 m in outdoor deployments, i.e., with an infrastructure density considerably higher than most dense networks of today. The wide transmission bandwidths needed to provide data rates of up to 10 Gbps and above can likely be obtained from spectrum allocations in the centimeter and millimeter-wave bands.

Besides using the traditional licensed spectrum bands, the wireless network is expected to operate in the unlicensed bands and the license shared bands especially for enterprise deployment scenarios. Thus, coexistence support is needed to enable efficient spectrum sharing among different operators and/or other systems. A flexible way to achieve the coexistence support, without needing to exchange information between different coexisting system, is Listen-before-talk (LBT). The LBT is a protocol where the desired channel on the wireless medium is first sensed for any potentially interfering transmissions before a transmission begins. If the medium is found idle, then the transmitter may start using it.

The LBT mechanism of Wi-Fi employs carrier sense multiple access with collision avoidance (CSMA/CA) for medium access. Wi-Fi can bond contiguous 20 MHz channels in a non-overlapping manner if the LBT operation shows these channels are idle. One of these channels is designated as a primary channel while the others are designated as secondary channels. Counting down of the random backoff counter is based on the outcome of clear channel assessment on the primary channel. On the secondary channels, only a quick clear channel assessment (CCA) check is performed for Point Coordination Function Interframe Space (PIFS) duration (generally 25 µs) before the potential start of transmission, to determine which of the secondary channels are also available in addition to the primary channel. The signal and energy detection thresholds for secondary channels are generally higher than those for the primary channel, and scale up with increasing channel bandwidth. Upon expiration of the backoff counter, the overall transmission bandwidth is determined by the results of the secondary CCA checks.

For License Assisted Access (LAA) which could aggregate one licensed carrier with multiple secondary unlicensed carriers, two main alternatives for multicarrier LBT are used:

Alternative 1: Single random backoff channel. Similar with Wi-Fi, only one LBT operation with random backoff needs to be performed on any one carrier along with quick CCA checks on the other channels, before transmission occurs. The energy detection threshold used on channels not performing the random backoff LBT is same as the one used on channel performing the random backoff LBT.

Alternative 2: Parallel random backoff channels. Multiple secondary carriers should each have individually completed a LBT operation with random backoff before transmitting simultaneously. Independent backoff counters or a common backoff counter can be used for multiple carriers. When a common backoff counter is used, the common random number shall be drawn based on the largest contention window (CW) size of the carriers which were used in the prior transmission.

SUMMARY

Figure 1:
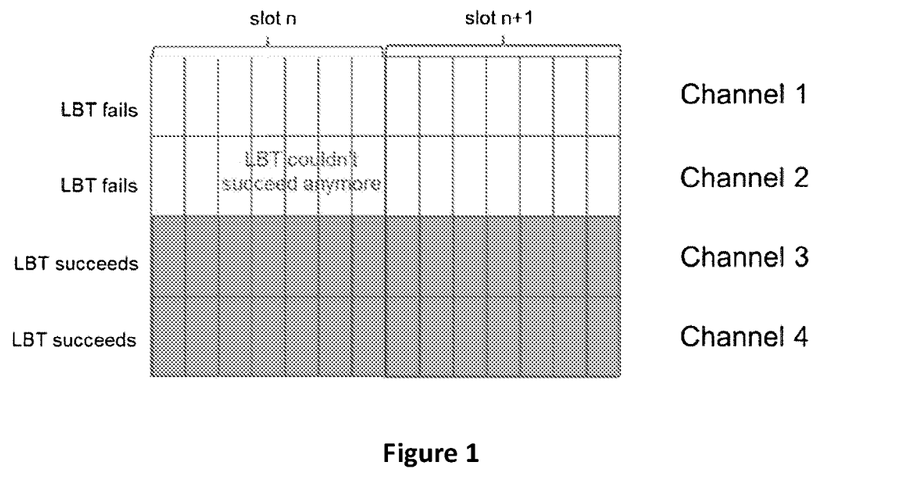
FIG. 1 schematically illustrates an example of listening and occupying on multiple channels in the prior art.

As mentioned above, the wireless network is expected to combine multiple channels to support high system capacity and high end-user data rates. In the environment where the channels are shared, such as an LAA system or standalone LTE system where unlicensed spectrum bands are to be used, if a node wants to transmit on a large bandwidth which consists of multiple channels, it should perform listening per each of the channels. Whether LAA or Wi-Fi, it will most probably occur that the listening succeeds (that is, the listening on a channel shows the channel is idle) at only part of the bandwidth. In this case, the data will be only transmitted in the part of bandwidth where the listening succeeds. One example is illustrated in FIG. 1, wherein a first node is capable of using a large bandwidth consisting of channels 1-4, and its listening only succeeds on channel 3 and 4 for transmission to a second node in slot n. Then it will only occupy channels 3 and 4 to conduct the transmission for the current slot n. For slot n+1, it will continue transmitting to the second node. The inventors find that, for this situation, the listening of the first node may not be successful anymore on other channels 1 and 2 in the bandwidth because the receiving chain of the first node on the other neighboring channels 1 and 2 will hear power leakage from its own transmitting chain on the occupied channel 3 and 4. This is really a resource waste since channel 1 and 2 may be probably not occupied by others in the later slot.

One of the objects of the present disclosure is to resolve or alleviate the above problem. The key idea of the present disclosure, if taking the above introduced scenario as an example, is to introduce an opposite direction transmission from the second node in a period (e.g., shown as "Switching period" in FIGS. 4 and 5) interposed between the current transmission and the continuing transmission on the occupied channels (e.g. channel 3 and 4 in FIG. 1), to create a listening opportunity for the first node on the other channels (e.g. channel 1 and 2 in FIG. 1), whereby the power leakage from the occupied channels will not impact the judgement of the listening of the first node on the other channels in that period. Therefore, the resource waste would probably be alleviated. On its already-occupied channels, e.g., the channels 3 and 4, the transmitter, e.g., the first node, suspends its transmission during the switching period. The introduced opposite transmission from the receiver, e.g., the second node, can still occupy those already-occupied channels, in the switching period, so that other node sharing the channels won't have an opportunity of successful listening on those channels. Therefore, after the switching period, the transmitter, e.g., the first node, can continues its data transmission without worrying losing occupation of its previous transmitting channel(s).

According to an aspect of the present disclosure, the object is achieved by a method of a first node which is capable of using multiple wireless channels, wherein one or more of the channels are occupied by the first node for its current transmission to a second node, the method comprising: sending an indication to the second node, to indicate the second node to transmit towards the first node on the one or more occupied channels in the period between the current transmission and the continuing transmission of the first node, wherein the indication contains information to enable the second node to determine when and how long to conduct the transmission; and listening on each of one or more other channels in the multiple wireless channels in the period for the continuing transmission.

According to another aspect of the present disclosure, the object is achieved by a first node which is capable of using multiple wireless channels, wherein one or more of the channels are occupied by the first node for its current transmission to a second node, the first node comprising: a processor; and a memory, having stored instructions that when executed by the processor cause the first node to perform the above method.

According to yet another aspect of the present disclosure, the object is achieved by a method of a second node, comprising: receiving an indication from a first node, wherein the indication is to indicate the second node to transmit towards the first node on one or more channels in the period between the current transmission to the second node and the continuing transmission of the first node, and the indication contains information to enable the second node to determine when and how long to conduct the transmission; and performing the transmission as indicated by the indication.

According to still another aspect of the present disclosure, the object is achieved by a second node, comprising: a processor; and a memory, having stored instructions that when executed by the processor cause the second node to perform the above method.

BRIEF DESCRIPTION OF THE DRAWINGS

The embodiments herein will now be further described in more detail in the following detailed description by reference to the appended drawings illustrating the embodiments and in which.

DETAILED DESCRIPTION OF EMBODIMENTS

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

As described above, to solve the problem aroused by power leakage such as shown in FIG. 1, the key idea of the present disclosure is to introduce an opposite direction transmission from the second node in a period (e.g., shown as "Switching period" in FIGS. 4 and 5) interposed between the current transmission and the continuing transmission on the occupied channels (e.g. channel 3 and 4 in FIG. 1), to create a listening opportunity for the first node on the other channels (e.g. channel 1 and 2 in FIG. 1) adjacent to the occupied channel, whereby the power leakage from the occupied channels will not impact the judgement of the listening on the neighboring channels in that period.

Figure 2:
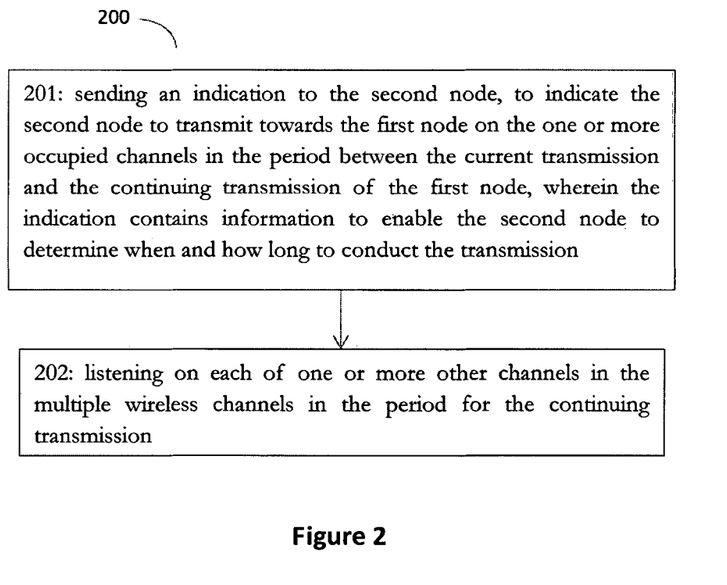
FIG. 2 schematically illustrates a flowchart of the method of the first node of the present disclosure.

In particular, for a first node which is capable of using multiple wireless channels, wherein one or more of the channels are occupied by the first node for its current transmission to a second node, the first node can perform a method according to an aspect of the present disclosure to resolve or alleviate the problem brought up by power leakage. The method is illustrated as method 200 in FIG. 2, and comprises the following steps: step 200 of sending an indication to the second node, to indicate the second node to transmit towards the first node on the one or more occupied channels in the period between the current transmission and the continuing transmission of the first node, wherein the indication contains information to enable the second node to determine when and how long to conduct the transmission; and step 201 of listening on each of one or more other channels in the multiple wireless channels in the period for the continuing transmission.

In an exemplary embodiment of the method, the period is longer than ideal duration of the listening. An "ideal duration" of a listening refers to the duration needed for accomplishing the listening on a channel in the ideal condition that the channel is idle. Setting the period to be longer than ideal duration of the listening will ensure that, the whole listening on the other channel(s) will not impacted by the power leakage from the occupied channel(s), thus further improving the listening.

In an exemplary embodiment of the method, both the interval between the current transmission and the transmission of the second node and the interval between the transmission of the second node and the continuing transmission in the period are shorter than or equal to a threshold, to avoid more listening of the first node on the one or more occupied channels for the continuing transmission. If either of the intervals is longer than the threshold, the first node needs to perform more listening on the occupied channel(s) to determine the state of said channel(s) again for the continuing transmission. By setting the intervals to be shorter than or equal to the threshold, the first node will keep its occupancy on the one or more occupied channels, thus the one or more occupied channels can still be used by the first node for the continuing transmission.

In an exemplary embodiment of the method, if the listening shows the one or more other channels are idle, it is possible for the first node to perform the continuing transmission on both the one or more occupied channels and the one or more other channels, thus maximizing utilization of the channels.

In an exemplary embodiment of the method, the first node performs the method based on one or more of the following conditions:

The ideal duration of the listening being less than a threshold: The first node may want to perform the method if the ideal duration of the listening is less than a threshold, because less ideal duration of a listening means higher possibility for the listening to succeed in that period.

The detected energy on the one or more other channels being less than a threshold: The first node could still detect the receiving energy on the one or more other channels during the current transmission, and ascertain there may be leakage power on the one or more other channels if the detected energy is less than a threshold, whereby the method may be needed.

Amount of data to be transmitted by the first node to the second node being larger than a threshold: If the first node has large amount of data to be transmitted to the second node, then the first node may want to occupy more channels for the transmission, and thus may want to perform the method.

Amount of data to be transmitted to the first node by the second node being larger than a threshold: If the first node knows the amount of data to be transmitted by the second node to the first node is enough to fill the period, the first node may want to perform the method.

Number of the one or more other channels being larger than a threshold: If the number of the one or more other channels is larger than a threshold, that means the utilization of the channels is poor for the first node, then the first node may want to occupy more channels for its transmission and thus the method is needed.

Figure 3:
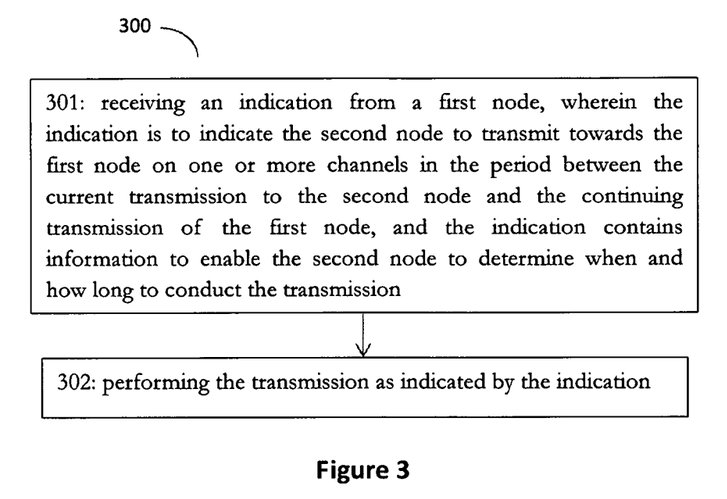
FIG. 3 schematically illustrates a flowchart of the method of the second node of the present disclosure.

The method of the second node is illustrated as method 300 in FIG. 3, and comprises the following steps: step 301 of receiving an indication from a first node, wherein the indication is to indicate the second node to transmit towards the first node on one or more channels in the period between the current transmission to the second node and the continuing transmission of the first node, and the indication contains information to enable the second node to determine when and how long to conduct the transmission; and step 302 of performing the transmission as indicated by the indication.

Now, further embodiments will be described in connection with the uplink and downlink situations. It will be understood that, although specific terms are used here, the embodiments are not limited to those specific terms but may be applied to all similar entities. For example, the "base station" herein may refer to e.g. access point, base station, macro base station, femto base stations, NodeB, eNodeB, gNodeB and so on, and the "user equipment"/"UE" herein may refer to e.g. user terminal, station, terminal, terminal node, and so on.

It can also be understood that, although the further embodiments herein are described in the context of a cellar network, the embodiments can be applied in any appropriate network where some wireless channels of the network can be occupied for use only if the listening on the channels is successful, such as a Wi-Fi network.

I. The Introduced Opposite Transmission of the Second Node is an Uplink Transmission.

Figure 4:
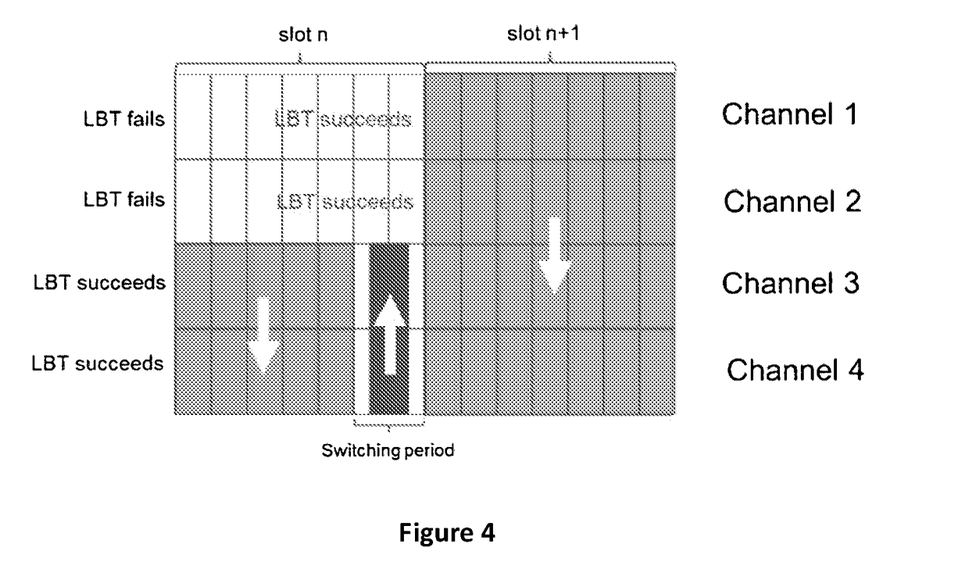
FIG. 4 schematically illustrates an exemplary embodiment of the present disclosure for a situation that the transmission of the second node is an uplink transmission.

In this situation, the first node may be a base station, and the second node may be a user equipment (UE). FIG. 4 shows an exemplary embodiment of the present disclosure for this situation.

As shown in FIG. 4, the base station is capable of using a bandwidth consisting of channels 1-4, and the listening of the base station has succeeded in part (e.g., channel 3 and 4 in FIG. 4) of the bandwidth, then channels 3 and 4 are occupied by the base station for its current transmission to the UE (e.g., the transmission in slot n in FIG. 4). In an attempt to further occupy the adjacent channels (e.g., channels 1 and 2 in FIG. 4) in the bandwidth, the base station may suspend its current transmission for a period after starting the current transmission and before continuing the transmission (for example, the base station may conduct the continuing transmission in e.g. slot n+1 in FIG. 4), and may send an indication to the UE, e.g. via L1/L2 signaling, to indicate the UE to transmit towards the base station on the one or more occupied channels (in this case, channels 3 and 4) in the period. The period is illustrated as "Switching period" in FIG. 4. The interval between the current transmission of the base station and the transmission of the UE is illustrated as the left white region in the "Switching period" in FIG. 4, and the interval between the transmission of the UE and the continuing transmission of the base station is illustrated as the right white region in the "Switching period" in FIG. 4.

The indication contains information to enable the UE to determine when and how long to conduct the transmission. For example, the indication may specify one or more of the following information:

The ending time point of the current transmission of the base station. If this is the only specification regarding the opposite transmission in the indication, the UE may determine when and how long to conduct its transmission according to this specification and a default understanding between the UE and the base station. For example, the default understanding may assume the starting time point of the next transmission opportunity (e.g., slot n+1 in FIG. 4) of the base station as the starting time point of the continuing transmission of the base station, then the UE knows it should start its transmission after said ending time point, and ends its transmission before said starting time point, preferably meeting the abovementioned threshold for the interval. The threshold for the interval is e.g. 16 µs.

The starting time point of the transmission of the UE. If this is the only specification regarding the opposite transmission in the indication, the UE may determine how long to conduct its transmission according this specification and the default understanding, as described above.

The time length of the period. If this is the only specification regarding the opposite transmission in the indication, the UE may first derive the ending time point of the current transmission of the base station based on this specification and the default understanding, and then determine when and how long to conduct its transmission according to said ending time point and the default understanding, as described above.

The time length of the transmission of the UE. The default understanding may further assume the sum of the time length of the transmission of the UE plus double of the threshold for the interval as the time length of the period. If only the time length of the transmission of the UE is specified in the indication, the UE may first derive the time length of the period according to the indicated time length and the default understanding, and then determine when to conduct its transmission according to the time length of the period and the default understanding, as described above.

The indication may also specify to the UE what to transmit in the period: it could be uplink (UL) signaling such as HARQ ACK/NACK, CSI feedback, SRS etc., or scheduled UL data if any.

After the UE determines when and how long to conduct its transmission based on the indication, the UE will conduct the transmission as indicated by the indication. As described above, the period is preferably longer than ideal duration of the listening of the base station on the one or more adjacent channels (e.g., channels 1 and 2 in FIG. 4) to ensure the whole listening on the adjacent channel(s) will not impacted by the power leakage from the occupied channel(s). Also as described above, both of the intervals are preferably shorter than or equal to a threshold (e.g., 16 µs), to keep the occupancy of the base station on the one or more occupied channels (e.g., channels 3 and 4 in FIG. 4).

After sending the indication, the base station will listen on each of one or more other channels (e.g., channels 1 and 2 in FIG. 4) in the period for the continuing transmission. If the listening is successful, it is possible for the base station to perform the continuing transmission on both the occupied channel(s) and the other channel(s). For example, in FIG. 4, upon on LBT succeeds at channel 1 and 2 in the switching period, BS could send the continuing data in the whole granted resource, i.e. channel 1, 2, 3 and 4.

II. The Introduced Opposite Transmission of the Second Node is a Downlink Transmission.

Figure 5:
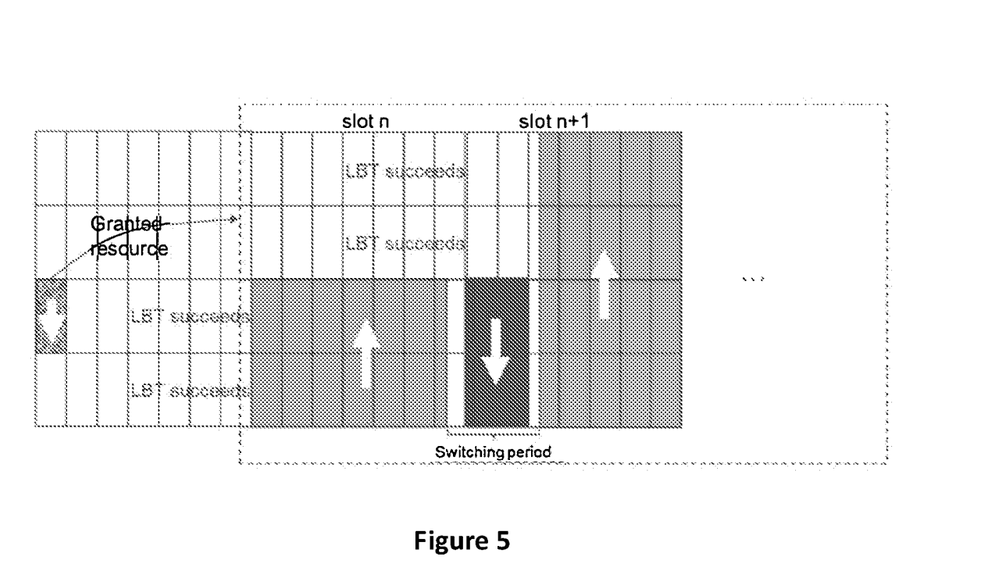
FIG. 5 schematically illustrates an exemplary embodiment of the present disclosure for a situation that the transmission of the second node is a downlink transmission.

In this situation, the first node may be a UE, and the second node may be a base station. FIG. 5 shows an exemplary embodiment of the present disclosure for this situation.

As shown in FIG. 5, the UE is capable of using a bandwidth consisting of channels 1-4 (e.g. due to a UL grant from the base station), and the listening of the UE has succeeded in part (e.g., channel 3 and 4 in FIG. 5) of the bandwidth, then channels 3 and 4 are occupied by the UE for its current transmission to the base station (e.g., the transmission in slot n). In an attempt to further occupy the adjacent channels (e.g., channels 1 and 2 in FIG. 5) in the bandwidth, the UE may suspend its current transmission for a period after starting the current transmission and before continuing the transmission (for example, the UE may be scheduled to conduct the continuing transmission in e.g. slot n+1 in FIG. 5), and may send an indication to the base station, e.g. via a MAC (Media Access Control) CE (Control Element), to indicate the base station to transmit towards the UE on the one or more occupied channels (in this case, channels 3 and 4) in the period. The period is illustrated as "Switching period" in FIG. 5. The interval between the current transmission of the UE and the transmission of the base station is illustrated as the left white region in the "Switching period" in FIG. 5, and the interval between the transmission of the base station and the continuing transmission of the UE is illustrated as the right white region in the "Switching period" in FIG. 5. As shown in FIG. 5, the UE may suspend its current transmission at a certain time point e.g. before the starting time point of the next transmission opportunity of the base station (such as, slot n+1 in FIG. 5) according to a default understanding between the UE and the base station. The certain time point is the ending time point of the current transmission of the UE.

The indication contains information to enable the base station to determine when and how long to conduct the transmission. For example, the UE may propose the length of the period or the starting time point of the continuing transmission in the indication, e.g., based on ideal duration of the listening of the UE on the one or more other channels (e.g., channels 1 and 2 in FIG. 5) for its continuing transmission.

If the length of the period is the only proposal in the indication, the base station may determine to start its transmission at the starting time point of its next transmission opportunity according to the default understanding, and may determine the time length of its transmission, such that the time length of its transmission is larger than or equal to the proposed length of the period.

If the starting time point of the continuing transmission is the only proposal in the indication, the base station may determine to start its transmission at the starting time point of its next transmission opportunity according to the default understanding, and may determine the time length of its transmission, such that its transmission may end at a time point later than or equal to the proposed time point.

After the base station determines when and how long to conduct its transmission based on information in the indication, the base station will conduct the indicated transmission in the period and may send scheduling information in this transmission to schedule the UE to conduct the continuing transmission. As described above, the period is preferably longer than ideal duration of the listening of the UE on the one or more other channels (e.g., channels 1 and 2 in FIG. 5) to ensure the whole listening on the other channel(s) will not impacted by the power leakage from the occupied channel(s). Also as described above, both the intervals in the period are preferably shorter than or equal to a threshold, to keep the occupancy of the UE on the one or more occupied channels (e.g., channels 3 and 4 in FIG. 5).

After sending the indication, the UE will listen on each of one or more other channels (e.g., channels 1 and 2 in FIG. 5) in the period for the continuing transmission. If the listening is successful, it is possible for the UE to perform the continuing transmission on both the occupied channel(s) and the other channel(s). For example, in FIG. 5, upon on UE LBT succeeds at channel 1 and 2 in the switching period, UE could send the continuing data in the whole granted resource, i.e. channel 1, 2, 3 and 4.

In a further embodiment, the base station could determine whether to permit the UE to send the indication, and if so, the base station will send a permission, e.g., included in a UL grant or a RRC signaling, to the UE. The base station may determine to permit this when the UE has such capability and there is downlink data to transmit. If there is no room for short opposite downlink transmission, the base station will not permit the UE to send the indication. Furthermore, this permission can be sent via another licensed channel. It is to be understood that, the step of sending the permission is optional for the solution of the present disclosure.

Figure 6:
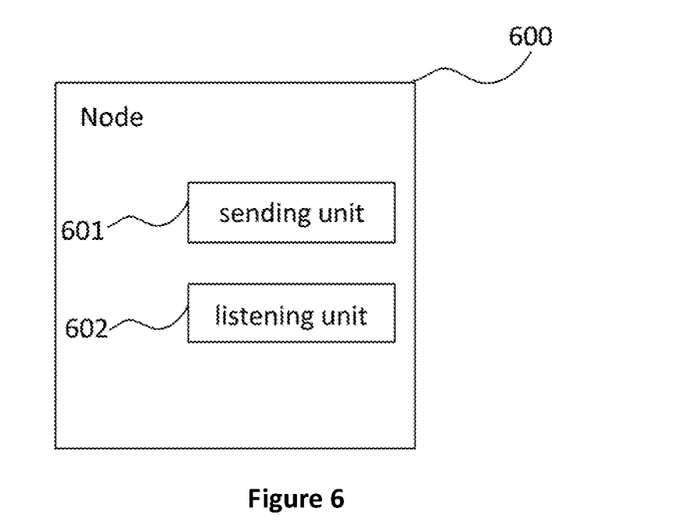
FIG. 6 is a schematic block diagram of a node 600, which can be configured as the first node of the present disclosure.

FIG. 6 shows a schematic block diagram of a node 600, which can be configured as the first node which is capable of using multiple wireless channels of the present disclosure. The node 600 includes a sending unit 601 and a listening unit 602. When one or more of the channels are occupied by the node 600 for its current transmission to a second node, the sending unit 601 is used for sending an indication to the second node, to indicate the second node to transmit towards the first node on the one or more occupied channels in the period between the current transmission and the continuing transmission of the first node, wherein the indication contains information to enable the second node to determine when and how long to conduct the transmission, and the listening unit 602 is used for listening on each of one or more other channels in the multiple wireless channels in the period for the continuing transmission. It can be appreciated that, the node 600 described herein may be implemented by various units, so that the node 600 implementing one or more functions of the first node described with the embodiments may comprise not only the units 601 and 602, but also other units for implementing the one or more functions of the first node described with the embodiments, and it may comprise separate units for each separate function, or a single unit may be configured to perform two or more functions. In addition, the units may be implemented in hardware (one or more apparatuses), firmware (one or more apparatuses), software (one or more modules), or combinations thereof.

Figure 7:
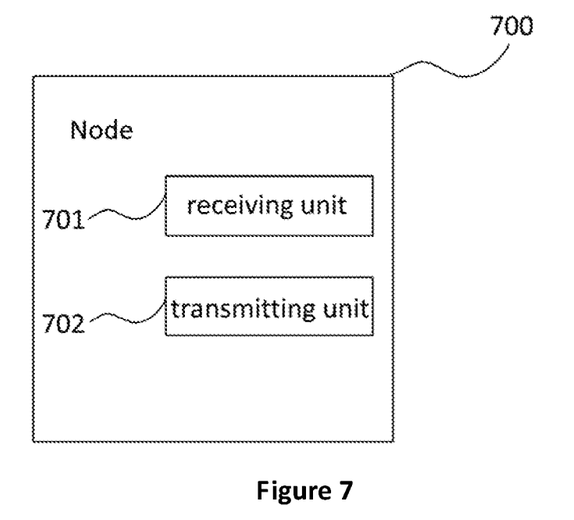
FIG. 7 is a schematic block diagram of a node 700, which can be configured as the second node of the present disclosure.

FIG. 7 shows a schematic block diagram of a node 700, which can be configured as the second node of the present disclosure. The node 700 includes a receiving unit 701 and a transmitting unit 702. The receiving unit 701 is used for receiving an indication from a first node, wherein the indication is to indicate the second node to transmit towards the first node on one or more channels in the period between the current transmission to the second node and the continuing transmission of the first node, and the indication contains information to enable the second node to determine when and how long to conduct the transmission, and the transmitting unit 702 is used for performing the transmission as indicated by the indication. It can be appreciated that, the node 700 described herein may be implemented by various units, so that the node 700 implementing one or more functions of the second node described with the embodiments may comprise not only the units 701 and 702, but also other units for implementing the one or more functions of the second node described with the embodiments, and it may comprise separate units for each separate function, or a single unit may be configured to perform two or more functions. In addition, the units may be implemented in hardware (one or more apparatuses), firmware (one or more apparatuses), software (one or more modules), or combinations thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 8:
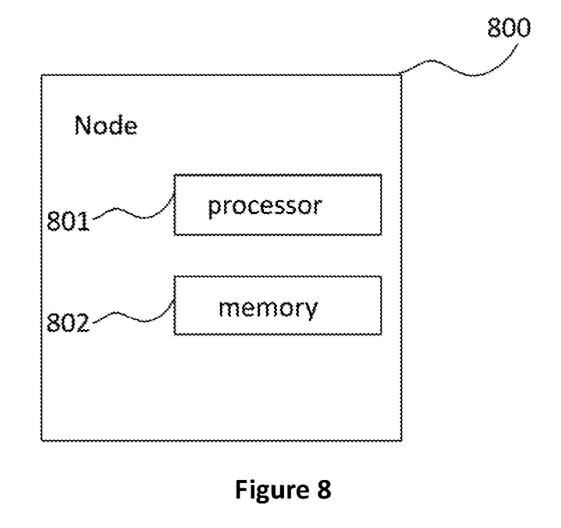
FIG. 8 is a schematic block diagram of a node 800 including a processor 801 and a memory 802, which can act as the first node or the second node of the present disclosure.

Therefore, the present disclosure also provides a node 800 including a processor 801 and a memory 802. FIG. 8 shows a schematic block diagram of the node 800. The node 800 can act as the first node or the second node of the present disclosure. When the node 800 is configured to act as the first node of the present disclosure, the memory 802 stores instructions that when executed by the processor 801 cause the node 800 to perform the method of the first node. When the node 800 is configured to act as the second node of the present disclosure, the memory 802 stores instructions that when executed by the processor 801 cause the node 800 to perform the method of the second node.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method in a first node capable of using multiple radio channels, one or more of the multiple radio channels being occupied by the first node for a current transmission to a second node, the method comprising:
sending an indication to the second node to indicate to the second node to transmit towards the first node on the one or more occupied radio channels that are for the current transmission to the second node, the indication containing information to enable the second node to determine when and how long to conduct a transmission of the second node towards the first node, the transmitting towards the first node on the one or more of the multiple radio channels being during a switching period, the switching period being a period between the current transmission and a continuing transmission from the first node, and:
an interval between the indicated transmission of the second node towards the first node and the current transmission; and
an interval between the indicated transmission of the second node towards the first node and the continuing transmission being shorter than or equal to a threshold;
listening on each of one or more radio channels in the multiple radio channels other than radio channels that are used by the second node during the switching period; and
performing the continuing transmission on both the one or more occupied radio channels and the one or more other radio channels when the listening shows that at least one of the one or more other radio channels are idle.

2. The method of claim 1, wherein the indicated transmission of the second node towards the first node is an uplink transmission, and the indication specifies one or more of:
an ending time point of the current transmission,
a starting time point of the transmission of the second node towards the first node,
a time length of the period, and
a time length of the transmission of the second node towards the first node.

3. The method of claim 1, wherein the indicated transmission of the second node towards the first node is a downlink transmission, and the indication proposes a length of the period or a starting time point of the continuing transmission.

4. A first node which is capable of using multiple radio channels, one or more of the multiple radio channels being occupied by the first node for a current transmission to a second node, the first node comprising:
a processor; and
a memory, having stored instructions that when executed by the processor cause the first node to:
send an indication to the second node to indicate to the second node to transmit towards the first node on the one or more occupied radio channels that are for the current transmission to the second node, the indication containing information to enable the second node to determine when and how long to conduct a transmission of the second node towards the first node, the transmitting towards the first node on the one or more of the multiple radio channels being during a switching period, the switching period being a period between the current transmission and a continuing transmission from the first node, and:
an interval between the indicated transmission of the second node towards the first node and the current transmission;
and an interval between the indicated transmission of the second node towards the first node and the continuing transmission being shorter than or equal to a threshold;
listen on each of one or more radio channels in the multiple radio channels other than radio channels that are used by the second node during the switching period; and
perform the continuing transmission on both the one or more occupied radio channels and the one or more other radio channels when the listening shows that at least one of the one or more other radio channels are idle.

5. The first node of claim 4, wherein the period is longer than an ideal duration of the listening.

6. The first node of claim 4, the instruction stored in the memory comprises one or more circumstances under which the processor causes the first node to perform the sending and listening step:
an ideal duration of the listening being less than a threshold;
a detected energy on one or more other radio channels being less than a threshold;
an amount of data to be transmitted from the first node to the second node being larger than a threshold;
an amount of data to be transmitted to the first node from the second node being larger than a threshold; and
a number of the one or more other radio channels being larger than a threshold.

7. The first node of claim 4, wherein the indicated transmission of the second node towards the first node is a downlink transmission or an uplink transmission.

8. The first node of claim 7, when the indicated transmission is a downlink transmission, the indication is sent via a Media Access Control (MAC) Control Element (CE), and the first node is further configured to:
receive a permission for the indication from the second node.

9. A method in a second node capable of using multiple radio channels for transmission, one or more of the multiple radio channels being occupied by a first node's current transmission to the second node, the method comprising:
receiving an indication from a first node, the indication indicating to the second node to transmit towards the first node on the one or more occupied radio channels that are for the current transmission to the second node, the indication containing information to enable the second node to determine when and how long to conduct a transmission of the second node towards the first node, the transmitting towards the first node on the one or more of the multiple radio channels being during a switching period, the switching period being a period between the first node's current transmission to the second node and a continuing transmission from the first node, and:
an interval between the indicated transmission of the second node towards the first node and the current transmission; and
an interval between the indicated transmission of the second node towards the first node and the continuing transmission being shorter than or equal to a threshold; and performing the continuing transmission on both the one or more occupied radio channels and the one or more other radio channels when the indication indicates that at least one of the one or more other radio channels are idle.

10. The method of claim 9, wherein the indicated transmission of the second node is an uplink transmission, and the indication specifies one or more of:
an ending time point of the current transmission,
a starting time point of the transmission of the second node towards the first node,
a time length of the period, and
a time length of the transmission of the second node towards the first node.

11. The method of claim 9, wherein the indicated transmission of the second node towards the first node is a downlink transmission, and the indication proposes a length of the period or a starting time point of the continuing transmission.

12. A second node, which is capable of using multiple radio channels for transmission, one or more of the multiple radio channels being occupied by a first node's current transmission to the second node, the second node comprising:
a processor; and
a memory, having stored instructions that when executed by the processor cause the second node to:
receive an indication from a first node, the indication indicating to the second node to transmit towards the first node on the one or more occupied radio channels that are for the current transmission to the second node, the indication containing information to enable the second node to determine when and how long to conduct a transmission of the second node towards the first node, the transmitting towards the first node on the one or more of the multiple radio channels being during a switching period, the switching period being a period between the first node's current transmission to the second node and a continuing transmission from the first node, and:
an interval between the indicated transmission of the second node towards the first node and the current transmission; and
an interval between the indicated transmission of the second node towards the first node and the continuing transmission being shorter than or equal to a threshold; and
perform the continuing transmission on both the one or more occupied radio channels and the one or more other radio channels, when the indication indicates that at least one of the one or more other radio channels are idle.

13. The second node of claim 12, wherein the period is longer than an ideal duration of the first node listening on one or more radio channels in multiple radio channels other than one or more radio channels that are occupied for the continuing transmission.

14. The second node of claim 12, wherein the indicated transmission of the second node is an uplink transmission or a downlink transmission.

15. The second node of claim 14, wherein the second node is further configured to send a permission for the indication to the first node when the indicated transmission is a downlink transmission.

16. The second node of claim 15, wherein the permission is included in a uplink (UL) grant or an RRC signaling.

* * * * *